(12) United States Patent
Hittle et al.

(10) Patent No.: US 8,196,403 B2
(45) Date of Patent: Jun. 12, 2012

(54) TURBOCHARGER HAVING BALANCE VALVE, WASTEGATE, AND COMMON ACTUATOR

(75) Inventors: Craig Phillip Hittle, Peoria, IL (US); Jonathan P. Kilkenny, Peoria, IL (US); David Andrew Pierpont, Dunlap, IL (US); Stephan Donald Roozenboom, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 795 days.

(21) Appl. No.: 12/222,009

(22) Filed: Jul. 31, 2008

(65) Prior Publication Data
US 2010/0024414 A1 Feb. 4, 2010

(51) Int. Cl.
*F02D 23/00* (2006.01)
*F16K 1/16* (2006.01)

(52) U.S. Cl. .................................................. 60/602

(58) Field of Classification Search .......... 60/605.2, 60/602, 612; 137/601.01, 601.09, 609.12, 137/609.15, 601.12, 601.15
See application file for complete search history.

(56) References Cited

U.S. PATENT DOCUMENTS

| | | | |
|---|---|---|---|
| 3,423,926 A | 1/1969 | Nancarrow et al. | |
| 3,559,397 A | 2/1971 | Navarro | |
| 4,177,006 A | 12/1979 | Nancarrow | |
| 4,179,892 A | 12/1979 | Heydrich | |
| 4,474,006 A | 10/1984 | Price et al. | |
| 4,526,004 A | 7/1985 | French et al. | |
| 4,544,326 A | 10/1985 | Nishiguchi et al. | |
| 4,611,465 A | 9/1986 | Kato et al. | |
| 4,893,474 A * | 1/1990 | Miller et al. .............. 60/602 |
| 5,069,194 A | 12/1991 | Deutschmann et al. | |
| 5,146,754 A | 9/1992 | Jain et al. | |
| 5,611,202 A | 3/1997 | Sumser et al. | |
| 5,611,203 A | 3/1997 | Henderson et al. | |
| 5,740,785 A | 4/1998 | Dickey et al. | |
| 5,791,146 A | 8/1998 | Dungner | |
| 5,794,445 A | 8/1998 | Dungner | |
| 5,943,864 A | 8/1999 | Sumser et al. | |
| 6,079,211 A * | 6/2000 | Woollenweber et al. ....... 60/612 |
| 6,216,459 B1 | 4/2001 | Daudel et al. | |
| 6,223,534 B1 | 5/2001 | Erdmann et al. | |
| 6,237,335 B1 | 5/2001 | Lönqvist | |
| 6,250,079 B1 * | 6/2001 | Zander et al. ................... 60/602 |
| 6,269,643 B1 | 8/2001 | Schmidt et al. | |
| 6,286,312 B1 | 9/2001 | Bertilsson | |
| 6,321,537 B1 | 11/2001 | Coleman et al. | |
| 6,324,847 B1 | 12/2001 | Pierpont | |
| 6,412,279 B1 | 7/2002 | Coleman et al. | |
| 6,418,721 B1 | 7/2002 | Coleman et al. | |
| 6,422,222 B1 | 7/2002 | Arbeiter et al. | |
| 6,460,519 B1 | 10/2002 | Pierpont | |
| 6,470,864 B2 | 10/2002 | Kim et al. | |
| 6,484,499 B2 | 11/2002 | Coleman et al. | |
| 6,543,228 B2 * | 4/2003 | Deacon .......................... 60/602 |
| 6,672,061 B2 | 1/2004 | Schmid et al. | |

(Continued)

*Primary Examiner* — Mary A Davis
(74) *Attorney, Agent, or Firm* — Finnegan, Henderson, Farabow, Garrett & Dunner LLP

(57) ABSTRACT

A turbocharger for a use with a combustion engine is provided. The turbocharger may have a turbine housing with a first volute, a second volute, and a common outlet. The turbocharger may also have a turbine wheel disposed between the common outlet and the first and second volutes. The turbocharger may further have a first valve configured to selectively fluidly communicate the first volute with the second volute upstream of the turbine wheel, a second valve configured to selectively fluidly communicate the second volute with the common outlet to bypass the turbine wheel, and a common actuator configured to move the first and second valves.

18 Claims, 8 Drawing Sheets

U.S. PATENT DOCUMENTS

| | | |
|---|---|---|
| 6,675,782 B1 | 1/2004 | Persson |
| 6,694,735 B2 | 2/2004 | Sumser et al. |
| 6,715,288 B1 | 4/2004 | Engels et al. |
| 6,715,289 B2 | 4/2004 | Mader et al. |
| 6,751,956 B2 | 6/2004 | Mayer et al. |
| 6,871,642 B1 | 3/2005 | Osterwald |
| 6,877,492 B1 | 4/2005 | Osterwald |
| 7,013,879 B2 | 3/2006 | Brookshire et al. |
| 7,043,913 B2 | 5/2006 | Nishiyama et al. |
| 7,051,527 B2 | 5/2006 | Schmid et al. |
| 7,165,403 B2 | 1/2007 | Sun et al. |
| 7,165,540 B2 | 1/2007 | Brookshire et al. |
| 7,222,614 B2 | 5/2007 | Bryant |
| 7,287,378 B2 | 10/2007 | Chen et al. |
| 7,363,761 B1 * | 4/2008 | Dickerson ................ 60/602 |
| 7,644,586 B2 * | 1/2010 | Yamagata ................ 60/612 |
| 2004/0074480 A1 | 4/2004 | Chen et al. |
| 2005/0103013 A1 | 5/2005 | Brookshire et al. |
| 2006/0060173 A1 | 3/2006 | Wei et al. |
| 2006/0070382 A1 | 4/2006 | Karlsson |
| 2006/0123785 A1 | 6/2006 | Sundin et al. |
| 2006/0123787 A1 | 6/2006 | Gobert et al. |
| 2006/0123788 A1 | 6/2006 | Gobert et al. |
| 2006/0174621 A1 | 8/2006 | Chen et al. |
| 2007/0028901 A1 | 2/2007 | Watakabe et al. |
| 2007/0119171 A1 | 5/2007 | Boyapati et al. |
| 2007/0175215 A1 | 8/2007 | Rowells |
| 2007/0193270 A1 | 8/2007 | Roozenboom et al. |
| 2007/0193564 A1 | 8/2007 | Takahashi et al. |
| 2008/0000228 A1 | 1/2008 | Kieser |
| 2008/0000229 A1 | 1/2008 | Kuspert et al. |
| 2009/0000296 A1 | 1/2009 | Pierpont et al. |
| 2010/0024416 A1 | 2/2010 | Gladden et al. |
| 2010/0024417 A1 | 2/2010 | Pierpont et al. |
| 2010/0024419 A1 | 2/2010 | Pierpont et al. |

\* cited by examiner

TURBOCHARGER HAVING BALANCE VALVE, WASTEGATE, AND COMMON ACTUATOR

TECHNICAL FIELD

The present disclosure is directed to a turbocharger and, more particularly, to a turbocharger having a balance valve, a wastegate, and an actuator common to both the balance valve and the wastegate valve.

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a divided exhaust manifold in fluid communication with a turbocharged air induction system.

The divided exhaust manifold increases engine power by helping to preserve exhaust pulse energy generated by the engine's combustion chambers. Preserving the exhaust pulse energy improves turbocharger operation, which results in a more efficient use of fuel. In addition, the turbocharged air induction system increases engine power by forcing more air into the combustion chambers than would otherwise be possible. This increased amount of air allows for enhanced fueling that further increases the power output generated by the engine.

In addition to the goal of maximizing engine power output and efficiency, it is desirable to simultaneously minimize exhaust emissions. That is, combustion engines exhaust a complex mixture of air pollutants as byproducts of the combustion process. And, due to increased attention on the environment, exhaust emission standards have become more stringent. The amount of pollutants emitted to the atmosphere from an engine can be regulated depending on the type of engine, size of engine, and/or class of engine.

One method that has been implemented by engine manufacturers to comply with the regulation of these exhaust emissions includes utilizing an exhaust gas recirculating (EGR) system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants.

EGR systems require a certain level of backpressure in the exhaust system to push a desired amount of exhaust back to the intake of the engine. And, the backpressure needed for adequate operation of the EGR system varies with engine load. Although effective, utilizing exhaust backpressure to drive EGR can adversely affect engine operation, thereby reducing fuel economy. Thus, a system is required to reduce exhaust back pressure while still providing the necessary EGR flow.

U.S. Pat. No. 6,321,537 to Coleman et al. ("the '537 patent") discloses a combustion engine utilizing an EGR system and a divided exhaust manifold together with a turbocharged air induction system. Specifically, the '537 patent describes an internal combustion engine having a plurality of combustion cylinders and an intake manifold in common fluid communication with the combustion cylinders. A first exhaust manifold and a second exhaust manifold are separately coupled with the combustion cylinders. A first variable geometry turbine is associated with the first exhaust manifold, and a second variable geometry turbine is associated with the second exhaust manifold. The EGR system includes a 3-way valve assembly disposed in fluid communication between the first exhaust manifold, the second exhaust manifold, and the intake manifold. The valve assembly includes an inlet fluidly coupled with an inlet of the first variable geometry turbine, a first outlet fluidly coupled with an inlet of the second variable geometry turbine, and a second outlet fluidly coupled with the intake manifold.

During operation of the combustion engine described in the '537 patent, exhaust flows in parallel from the first exhaust manifold to the first variable geometry turbine and from the first exhaust manifold to the valve assembly. Spent exhaust from the first variable geometry turbine is mixed with exhaust from the second exhaust manifold and fed to the second variable geometry turbine. Spent exhaust from the second variable geometry turbine is discharged to the ambient environment. The valve assembly is selectively actuated to control a flow of exhaust from the two outlets. Exhaust flowing from the first outlet mixes with exhaust from the second exhaust manifold and flows into the second variable geometry turbine. Exhaust from the second outlet is cooled and then mixed with combustion air. The mixture of combustion air and exhaust is then transported to the inlet manifold. Controlling the amount of exhaust gas which is transported to the intake manifold provides effective exhaust gas recirculation within the combustion engine. Moreover, controlling the flow of exhaust to the second variable geometry turbine utilizes energy from the exhaust which is not transported to the intake manifold to drive the second variable geometry turbine.

Although the system in the '537 patent may adequately control exhaust gas recirculation in a turbocharged engine, it may be less than optimal. That is, in some situations, the backpressure within the first exhaust manifold may be excessive. And, without any way to relieve this backpressure, damage to the first variable geometry turbocharger may be possible.

The disclosed turbocharger is directed to overcoming one or more of the problems set forth above and/or other problems of the prior art.

SUMMARY

In one aspect, the disclosure is directed toward a turbocharger. The turbocharger may include a turbine housing with a first volute, a second volute, and a common outlet. The turbocharger may also include a turbine wheel disposed between the common outlet and the first and second volutes. The turbocharger may further include a first valve configured to selectively fluidly communicate the first volute with the second volute upstream of the turbine wheel, a second valve configured to selectively fluidly communicate the second volute with the common outlet to bypass the turbine wheel, and a common actuator configured to move the first and second valves.

In another aspect, the disclosure is directed toward a method of handling exhaust from an engine having a first plurality of combustion chambers and a second plurality of combustion chambers. The method may include receiving exhaust from the first plurality of combustion chambers, and receiving exhaust from the second plurality of combustion chambers. The method may also include moving a valve assembly in a first direction by a first amount to mix exhaust received from the first plurality of combustion chambers with exhaust received from the second plurality of combustion chambers, directing exhaust received from the first and second pluralities of combustion chambers through a turbine, and moving the valve assembly in the first direction by a second amount to allow exhaust received from the second plurality of combustion chambers to bypass the turbine.

In yet another aspect, the disclosure is directed toward a power system. The power system may include an engine having a first plurality of combustion chambers and a second plurality of combustion chambers. The power system may also include a first exhaust manifold configured to receive exhaust from only the first plurality of combustion chambers, a second exhaust manifold configured to receive exhaust from only the second plurality of combustion chambers, and a turbocharger. The turbocharger may have a first volute in fluid communication with the first exhaust manifold, a second volute having a greater flow capacity than the first volute and being in fluid communication with the second exhaust manifold, a turbine wheel configured to receive exhaust from the first and second volutes, and a common outlet. The power system may further include a valve assembly configured to selectively fluidly communicate the first volute with the second volute at a location upstream of the turbine wheel, and to selectively fluidly communicate the second volute with the common outlet to bypass the turbine wheel and a single actuator configured to move the valve assembly.

DETAILED DESCRIPTION

Figure 1:
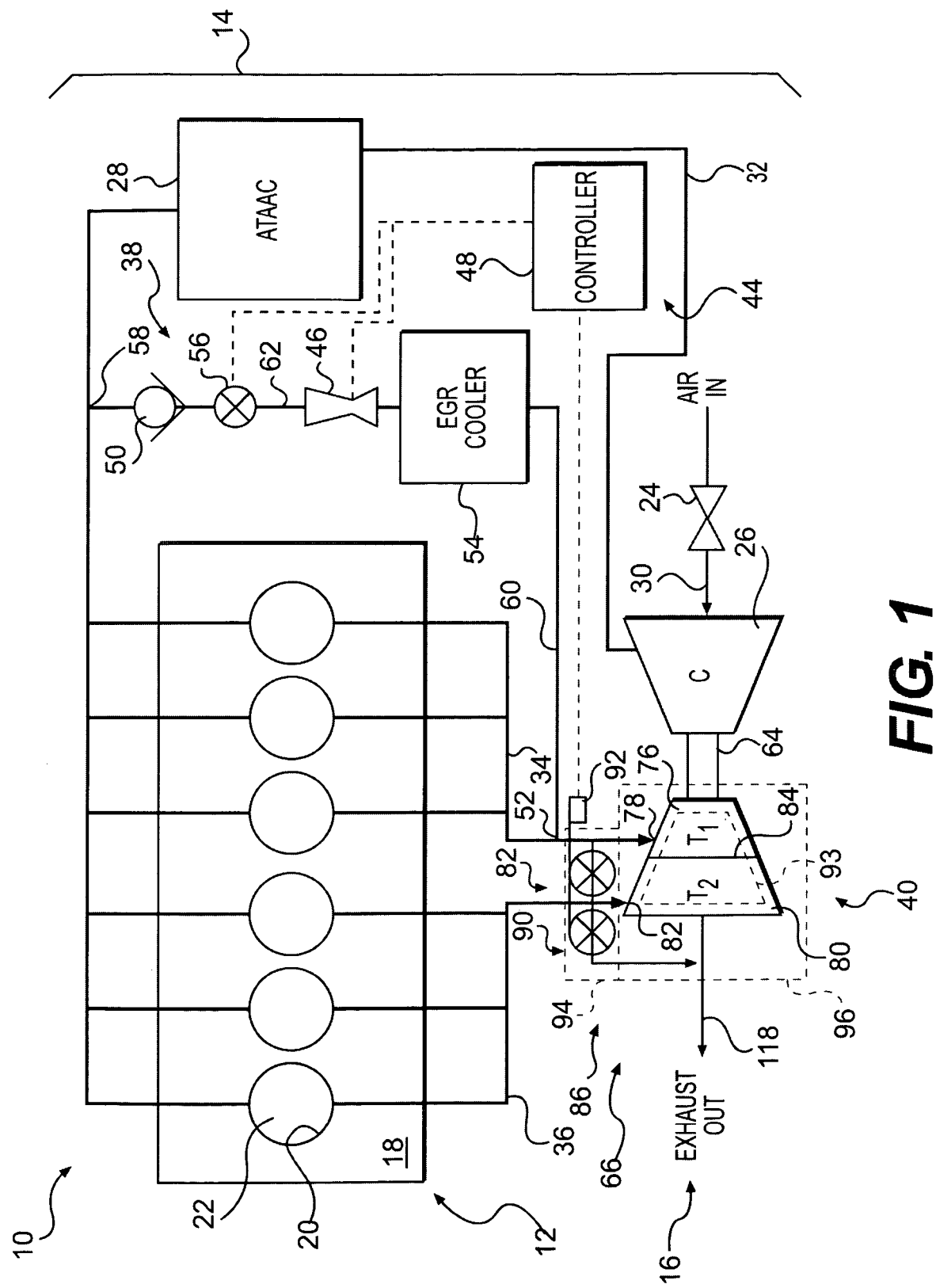
FIG. 1 is a diagrammatic illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes six such combustion chambers 22. However, it is contemplated that power source 12 may include a greater or lesser number of combustion chambers 22 and that combustion chambers 22 may be disposed in an "in-line" configuration, a "V" configuration, or in any other suitable configuration.

Air induction system 14 may include components configured to introduce charged air into power source 12. For example, air induction system 14 may include an induction valve 24, one or more compressors 26, and an air cooler 28. Induction valve 24 may be connected upstream of compressor 26 via a fluid passageway 30 and configured to regulate a flow of atmospheric air to power source 12. Compressor 26 may embody a fixed geometry compressor configured to receive air from induction valve 24 and compress the air to a predetermined pressure level before it enters power source 12. Compressor 26 may be connected to power source 12 via a fluid passageway 32. Air cooler 28 may be disposed within fluid passageway 32, between power source 12 and compressor 26 and embody, for example, an air-to-air heat exchanger, an air-to-liquid heat exchanger, or a combination of both to facilitate the transfer of thermal energy to or from the compressed air directed into power source 12.

Exhaust system 16 may include components configured to direct exhaust from power source 12 to the atmosphere. Specifically, exhaust system 16 may include first and second exhaust manifolds 34 and 36 in fluid communication with combustion chambers 22, an exhaust gas recirculation (EGR) circuit 38 fluidly communicating first exhaust manifold 34 with air induction system 14, a turbine 40 associated with first and second exhaust manifolds 34, 36, and a control system 44 for regulating exhaust flows from exhaust system 16 to air induction system 14. It is contemplated that exhaust system 16 may include components in addition to those listed above such as, for example, particulate removing devices, constituent absorbers or reducers, and attenuation devices, if desired.

Exhaust produced during the combustion process within combustion chambers 22 may exit power source 12 via either first exhaust manifold 34 or second exhaust manifold 36. First exhaust manifold 34 may fluidly connect a first plurality of combustion chambers 22 of power source 12 (e.g., the first three combustion chambers 22 from the right shown in FIG. 1) to turbine 40. Second exhaust manifold 36 may fluidly connect a second plurality of combustion chambers 22 of power source 12 (e.g., the final three combustion chambers from the right shown in FIG. 1) to turbine 40.

EGR circuit 38 may include components that cooperate to redirect a portion of the exhaust produced by power source 12 from first exhaust manifold 34 to air induction system 14. Specifically, EGR circuit 38 may include an inlet port 52, an EGR cooler 54, a recirculation control valve 56, and a discharge port 58. Inlet port 52 may be fluidly connected to first exhaust manifold 34 upstream of turbine 40 and fluidly connected to EGR cooler 54 via a fluid passageway 60. Discharge port 58 may receive exhaust from EGR cooler 54 via a fluid passageway 62, and discharge the exhaust to air induction system 14 at a location downstream of air cooler 28. Recirculation control valve 56 may be disposed within fluid passageway 62, between EGR cooler 54 and discharge port 58. It is contemplated that a check valve, for example a reed-type check valve 50 may be situated within fluid passageway 62 upstream or downstream of recirculation control valve 56 at a location where exhaust mixes with inlet air to provide for a unidirectional flow of exhaust through EGR circuit 38 (i.e., to inhibit bidirectional exhaust flows through EGR circuit 38), if desired.

Recirculation control valve 56 may be located to control the flow of exhaust recirculated through EGR circuit 38. Recirculation control valve 56 may be any type of valve known in the art such as, for example, a butterfly valve, a diaphragm valve, a gate valve, a ball valve, a poppet valve, or a globe valve. In addition, recirculation control valve 56 may be solenoid-actuated, hydraulically-actuated, pneumatically-actuated or actuated in any other manner to selectively restrict or completely block the flow of exhaust through fluid passageways 60 and 62.

EGR cooler 54 may be configured to cool exhaust flowing through EGR circuit 38 and, subsequently, components within EGR circuit 38 (e.g., recirculation control valve 56). EGR cooler 54 may include a liquid-to-air heat exchanger, an air-to-air heat exchanger, or any other type of heat exchanger known in the art for cooling an exhaust flow.

Turbine 40 may be a fixed geometry turbine configured to drive compressor 26. For example, turbine 40 may be directly and mechanically connected to compressor 26 by way of a shaft 64 to form a fixed geometry turbocharger 66. As the hot exhaust gases exiting power source 12 move through turbine 40 and expand against blades (not shown) therein, turbine 40 may rotate and drive the connected compressor 26 to pressurize inlet air.

Turbine 40 may include a divided housing having a first volute 76 with a first inlet 78 fluidly connected with first exhaust manifold 34, and a second volute 80 with a second inlet 82 fluidly connected with second exhaust manifold 36 (i.e., turbocharger 66 may have dual volutes). A wall member 84 may divide first volute 76 from second volute 80. It should be understood that at least a part of first volute 76 and/or first inlet 78 may have a smaller cross-sectional area and/or area/radius (A/R) ratio than second volute 80 and/or second inlet 82. The smaller cross-sectional area or A/R ratio may help restrict the flow of exhaust through first exhaust manifold 34, thereby creating backpressure sufficient to push at least a portion of the exhaust from first exhaust manifold 34 through EGR circuit 38.

A valve assembly 86 may be associated with turbine 40 to regulate a pressure of exhaust within EGR circuit 38. Valve assembly 86 may include, among other things, a balance valve 88, a wastegate valve 90, and a common actuator 92. Balance valve 88 may be configured to selectively allow exhaust from first volute 76 to pass to second volute 80. Wastegate valve 90 may be configured to selectively allow exhaust from second volute 80 to bypass a turbine wheel 93 of turbine 40. Common actuator 92 may be controlled to move both balance valve 88 and wastegate valve 90 between flow passing and flow blocking positions. Valve assembly 86 may be integral with turbine 40 and at least partially enclosed by a valve housing 94 that mounts to a turbine housing 96 of turbine 40.

Balance valve 88 may be configured to regulate a pressure of exhaust within first exhaust manifold 34 by selectively allowing exhaust to flow from first volute 76 to second volute 80. It should be understood that the pressure within first exhaust manifold 34 may affect the amount of exhaust pushed through EGR circuit 38. That is, when exhaust flows from first volute 76 to second volute 80 by way of balance valve 88, a pressure within first exhaust manifold 34 may be reduced and, as a result of this reduction, an amount of exhaust forced from first exhaust manifold 34 through EGR circuit 38 may be reduced by a proportional amount. It should also be noted that, because exhaust may selectively be allowed to flow from first volute 76 to second volute 80 by way of balance valve 88, a pressure differential between first and second volutes 76 and 80 may be minimized, thereby minimizing an impact this pressure differential may have on turbocharger efficiency.

Figure 2:
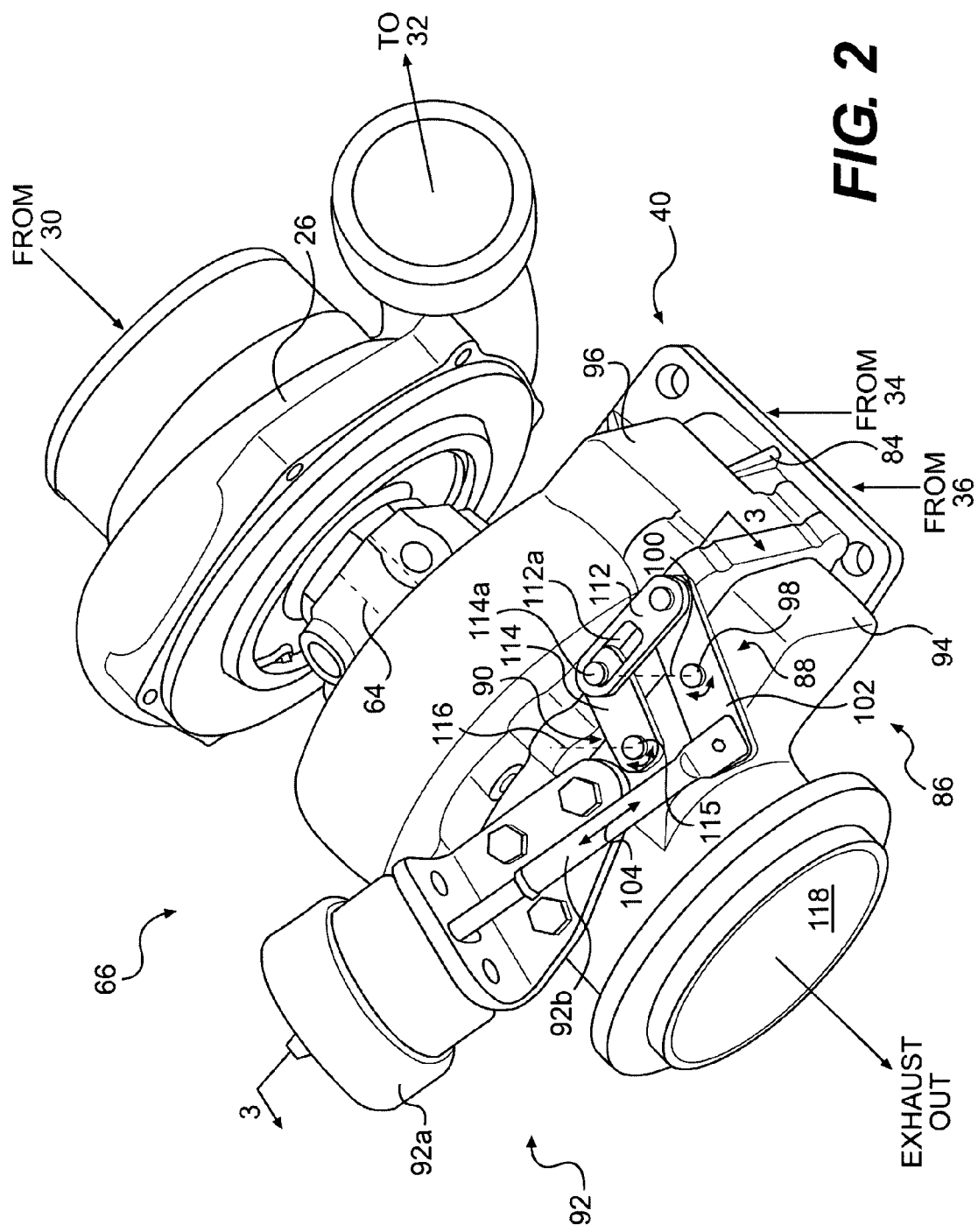
FIG. 2 is a pictorial illustration of an exemplary disclosed turbocharger that may be used with the power system of FIG. 1.

As shown in FIG. 2, balance valve 88 may be fixedly connected to common actuator 92. Specifically, balance valve 88 may include a valve member 98 having a pivot axis 100. A pivot member 102 may be fixedly connected at a center thereof to valve member 98, and at an end thereof to common actuator 92. In this configuration, as common actuator 92 moves linearly in the direction of an arrow 104, pivot member 102 and connected valve member 98 may both be caused to rotate together about pivot axis 100.

Figure 3:
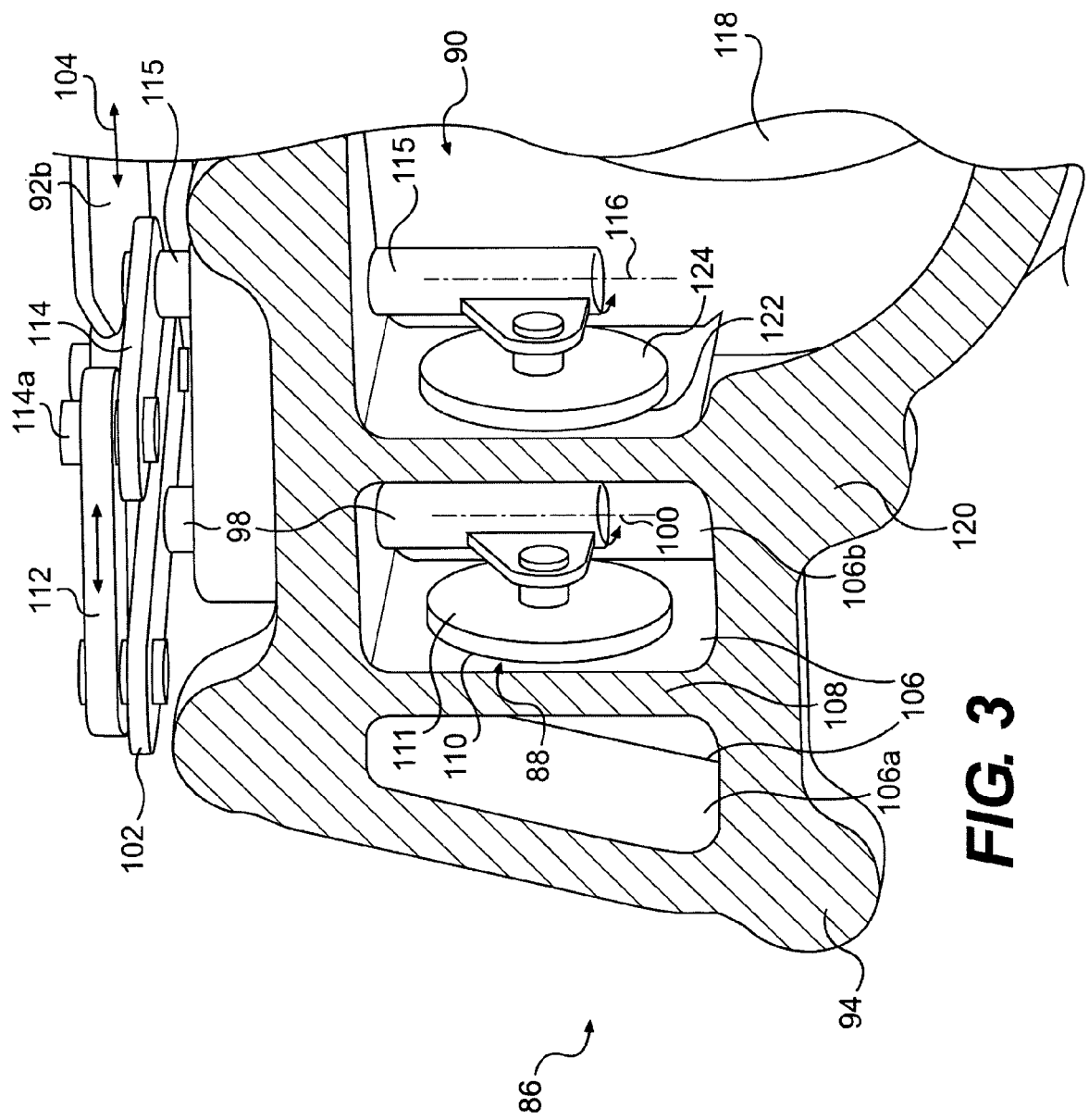
FIG. 3 is a pictorial illustration of a portion of the turbocharger shown in FIG. 2.
Figure 4:
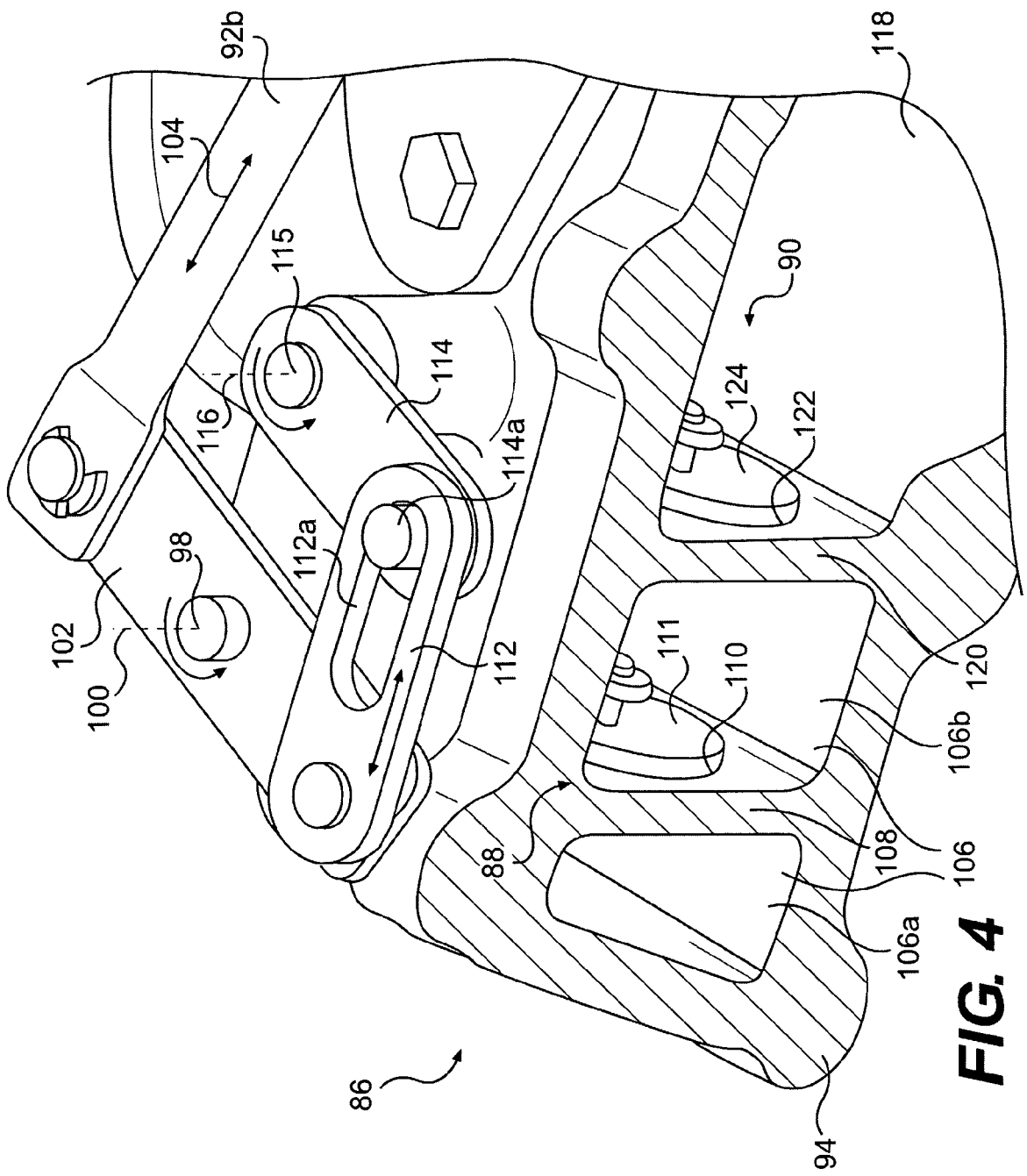
FIG. 4 is a pictorial illustration of a portion of the turbocharger shown in FIG. 2.

As illustrated in FIGS. 3 and 4, valve housing 94 may at least partially define a fluid chamber 106 divided into two compartments 106a and 106b by a wall member 108. Compartment 106a may fluidly communicate with first volute 76, while compartment 106b may fluidly communicate with second volute 80. A port 110 within wall member 108 may fluidly connect compartments 106a and 106b, and a sealing element 111 of valve member 98 may selectively pivot about pivot axis 100 to open or close port 110 and thereby selectively restrict a flow of exhaust from first volute 76 to second volute 80 by way of port 110.

Referring back to FIG. 2, wastegate valve 90 may be connected to balance valve 88 and to common actuator 92 by way of a link member 112. In particular, a pivot member 114 may be connected at one end thereof to a valve member 115 of wastegate valve 90, and include a protrusion 114a at an opposing end thereof. Link member 112 may be fixedly connected to an end of pivot member 102, opposite the connection of pivot member 102 to common actuator 92, and include a channel 112a configured to slidingly receive protrusion 114a of pivot member 114. In this configuration, as balance valve 88 and pivot member 102 are rotated about pivot axis 100 by linear movement of common actuator 92, link member 112 may also move linearly in a direction substantially opposite the movement of common actuator 92. And, as link member 112 moves linearly, protrusion 114a may be caused to slide within channel 112a of link member 112 until an end of channel 112a is engaged. Once the end of channel 112a is engaged by protrusion 114a, pivot member 114 and connected valve member 115 may then be rotated about an axis 116 together with pivot member 102 and connected valve member 98 about pivot axis 100 by further movement of common actuator 92 in the same direction. When common actuator 92 moves in a reverse direction, balance valve 88 may again move first (i.e., before movement of wastegate valve 90 is initiated) until an opposing end of channel 112a is engaged by protrusion 114a.

Referring again to FIGS. 3 and 4, fluid chamber 106 may be separated from a common outlet 118 of turbine 40 by a wall member 120. A port 122 within wall member 120 may connect fluid chamber 106 with common outlet 118, and a sealing element 124 of valve member 115 may selectively pivot about axis 116 to open or close port 122 and thereby restrict a flow of exhaust from second volute 80 to outlet 118 (i.e., sealing element 124 may selectively allow or restrict exhaust within second volute 80 from bypassing turbine wheel 93 of turbine 40).

Referring again to FIG. 2, common actuator 92 may be pneumatically operated to initiate movement of balance valve 88 and wastegate valve 90. Specifically, common actuator 92 may include a spring-biased piston member (not shown) disposed within a pressure chamber 92a and fixedly connected to a piston rod 92b. Pressurized air directed into pressure chamber 92a may urge the spring-biased piston member from a first position away from pressure chamber 92a toward a second position. Conversely, allowing the pressurized air to drain from pressure chamber 92a may return the spring-biased piston member to the first position. As piston rod 92b translates between the first and second positions, balance valve 88 may first move, followed by movement of wastegate valve 90. It is contemplated that common actuator 92 may alternatively be mechanically operated, hydraulically operated, electrically operated, or operated in any other suitable manner. It is also contemplated that piston rod 92b may be moved to any position between the first and second positions to thereby provide more than two levels of actuation, if desired (i.e., common actuator 92 may be a proportional actuator, wherein a movement amount of piston rod 92b is directly proportional to a pressure of the air directed into pressure chamber 92a).

Referring back to FIG. 1, control system 44 may include components that function to regulate the flow rate and pressure of exhaust passing though first volute 76, second volute 80, and EGR circuit 38 by adjusting the position of recirculation control valve 56, balance valve 88, and/or wastegate valve 90 in response to sensory input. Specifically, control system 44 may include a sensor 46, and a controller 48 in communication with sensor 46, recirculation control valve 56, and common actuator 92. Based on signals received from sensor 46, controller 48 may adjust a position of recirculation control valve 56 and/or of common actuator 92 to vary the restrictions provided by recirculation control valve 56, balance valve 88, and/or wastegate valve 90.

Although shown as located downstream of EGR cooler 54 and upstream of recirculation control valve 56, sensor 46 may alternatively be located anywhere within EGR circuit 38 and embody, for example, a mass air flow sensor such as a hot wire anemometer or a venturi-type sensor configured to sense pressure and/or a flow rate of exhaust passing through EGR circuit 38. Controller 48 may use signals produced by sensor 46 to determine and/or adjust a backpressure within first exhaust manifold 34 such that a desired amount of exhaust is recirculated back into power source 12 for subsequent combustion. This adjustment of pressure will be further explained in more detail below.

Controller 48 may embody a single or multiple microprocessors, field programmable gate arrays (FPGAs), digital signal processors (DSPs), etc. that include a means for controlling an operation of power system 10 in response to signals received from sensor 46. Numerous commercially available microprocessors can be configured to perform the functions of controller 48. It should be appreciated that controller 48 could readily embody a microprocessor separate from that controlling other non-exhaust related power system functions, or that controller 48 could be integral with a general power system microprocessor and be capable of controlling numerous power system functions and modes of operation. If separate from a general power system microprocessor, controller 48 may communicate with the general power system microprocessor via data links or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

Before regulating the flow of exhaust through EGR circuit 38, controller 48 may first receive data indicative of an operational condition of power source 12 or a desired exhaust flow rate and/or pressure. Such data may be received from another controller or computer (not shown). In an alternative embodiment, operational condition data may be received from sensors strategically located throughout power system 10. Controller 48 may then utilize stored algorithms, equations, subroutines, look-up maps, and/or tables to analyze the operational condition data and determine a corresponding desired exhaust pressure and/or flow rate through EGR circuit 38.

Controller 48 may also receive signals from sensor 46 indicative of the flow rate or pressure of exhaust flowing through first exhaust manifold 34. Upon receiving input signals from sensor 46, controller 48 may perform a plurality of operations utilizing stored algorithms, equations, subroutines, look-up maps and/or tables to determine whether the flow rate or pressure of exhaust flowing through first exhaust manifold 34 is within a desired range for producing the desired exhaust flow rate through EGR circuit 38. In an alternate embodiment, it is contemplated that controller 48 may receive signals from various sensors (not shown) located throughout exhaust system 16 and/or power system 10 instead of sensor 46. Such sensors may sense parameters that may be used to calculate the flow rate or pressure of exhaust flowing through first exhaust manifold 34, if desired.

Based on the comparison of the actual EGR flow rate and/or pressure with the desired range of flow rates and/or pressures, controller 48 may adjust operation of exhaust system 16. That is, controller 48 may adjust operation of recirculation control valve 56, of balance valve 88, and/or of wastegate valve 90 to affect the pressure within first exhaust manifold 34 and the resulting flow rates of exhaust through EGR circuit 38, first volute 76, and second volute 80. To increase the flow rate and pressure of exhaust passing through first volute 76 and EGR circuit 38, and to simultaneously decrease the flow rates and pressures of exhaust passing through second volute 80, balance valve 88 may be closed to a greater extent. To decrease the flow rate and pressure of exhaust passing through first volute 76 and EGR circuit 38, and to simultaneously increase the flow rates and pressures of exhaust passing through second volute 80, balance valve 88 may be opened. Recirculation control valve 56 may be opened to increase an EGR flow rate and decrease exhaust flow through first volute 76, and closed to decrease an EGR flow rate and increase exhaust flow through first volute 76. In one embodiment, controller 48 may primarily adjust operation of balance valve 88 to achieve a desired flow rate and/or pressure of exhaust through EGR circuit 38. After balance valve 88 has been adjusted to a maximum or minimum position, controller 48 may then adjust operation of recirculation control valve 56 and/or wastegate valve 90 to provide further EGR modulation.

Figure 5:
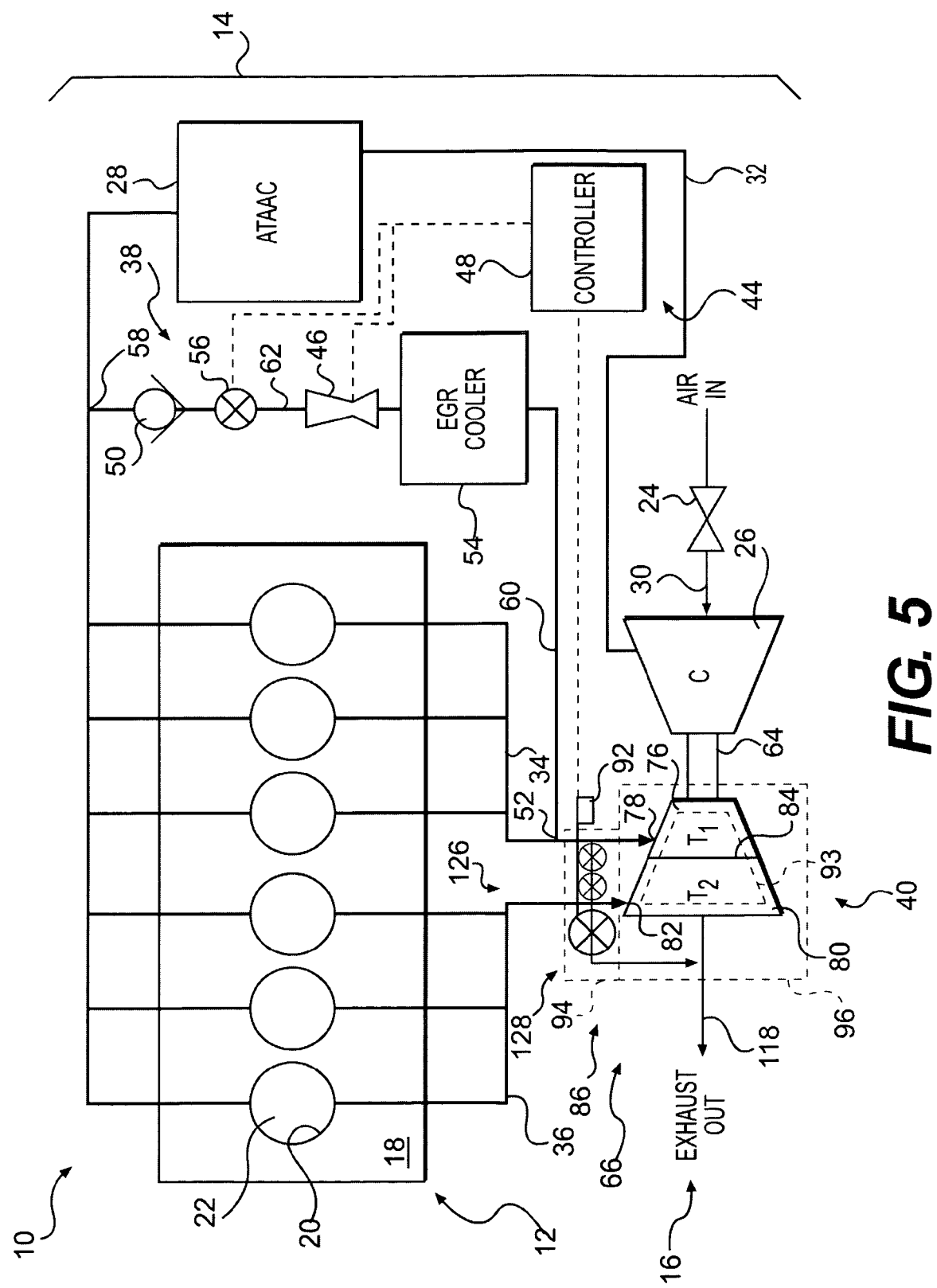
FIG. 5 is a pictorial illustration of another exemplary disclosed power system.

FIG. 5 illustrates an alternative embodiment of power system 10. Similar to the embodiment of FIG. 1, the embodiment of FIG. 5 includes power system 10 having power source 12, air induction system 14, and exhaust system 16. However, in contrast to the embodiment of FIG. 1, turbine 40 of exhaust system 16 may include a different valve assembly 86. That is, valve assembly 86 of FIG. 5 may include a balance valve 126 and a wastegate valve 128 moved by common actuator 92. Balance valve 126 may include two separate valve members, and wastegate valve 128 may have a different configuration than in the previous embodiments. In addition, the linkage connecting balance valve 126 and wastegate valve 128 to common actuator 92 may be different, as will be described in more detail below.

Figure 6:
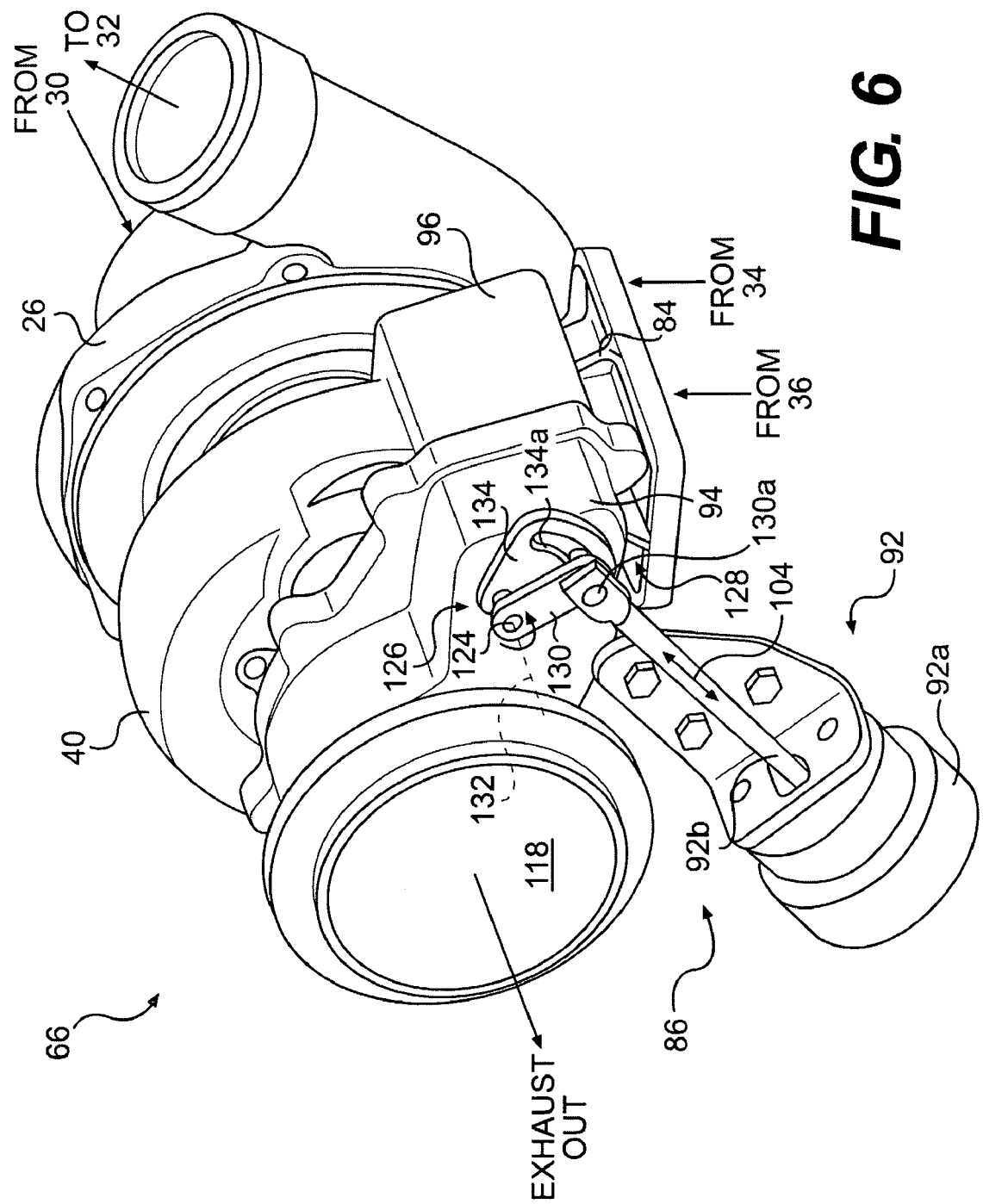
FIG. 6 is a pictorial illustration of an exemplary disclosed turbocharger that may be used with the power system of FIG. 5.

Balance valve 126 and wastegate valve 128 may connect to and be moved by common actuator 92 in a manner similar to the embodiments of FIGS. 1-5. That is, as illustrated in FIG. 6, balance valve 126 may be fixedly connected to common actuator 92 by way of a pivot member 130 to rotate about a pivot axis 132. Wastegate valve 128 may include a pivot member 134 having a channel 134a. And, as common actuator 92 begins to move linearly, only pivot member 130 and connected balance valve 126 may move until a protrusion 130a of pivot member 130 engages an end of channel 134a. Once protrusion 130a engages the end of channel 134a, pivot member 134 and connected wastegate valve 128 may also be moved by the linear motion of common actuator 92.

Figure 7:
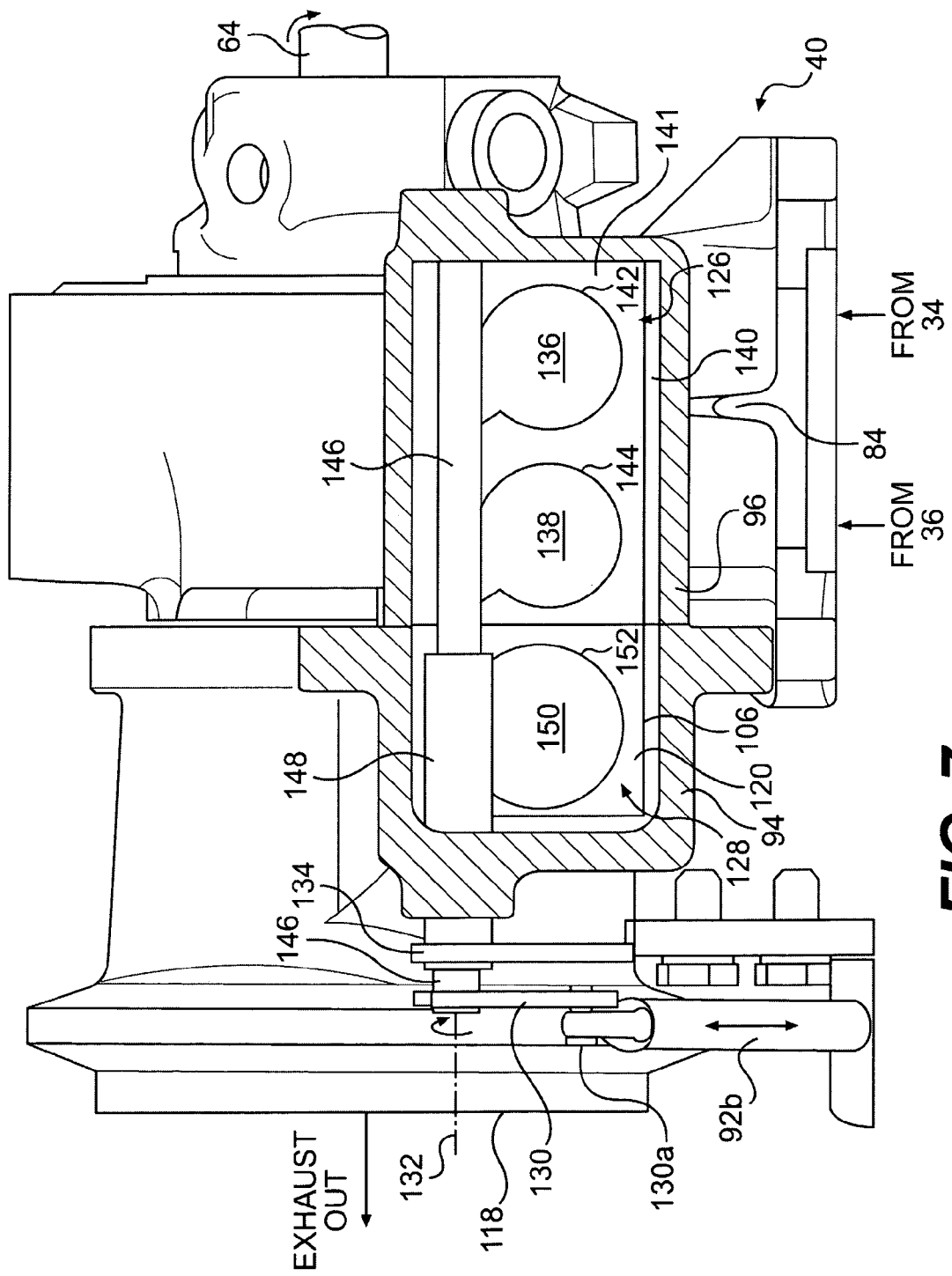
FIG. 7 is a pictorial illustration of a portion of the turbocharger shown in FIG. 6.
Figure 8:
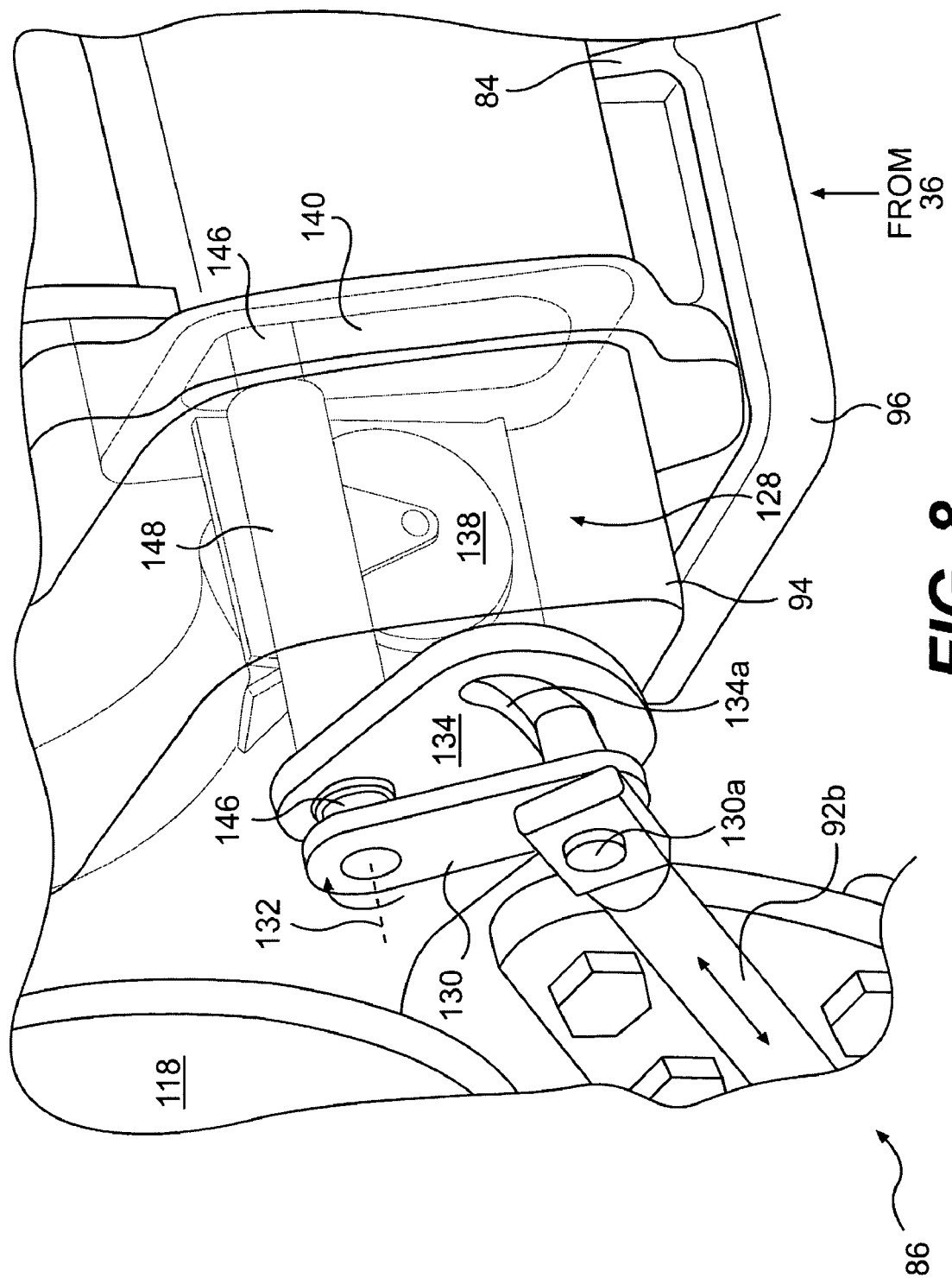
FIG. 8 is a pictorial illustration of a portion of the turbocharger shown in FIG. 6.

As shown in FIGS. 7 and 8, balance valve 126 may include a first valve member 136 and a second valve member 138 rigidly connected to each other and disposed at least partially within a fluid chamber 140. Fluid chamber 140 may be at least partially defined by turbine housing 96 (i.e., at least partially defined by a wall member 141 of turbine housing 96) and fluidly communicate with fluid chamber 106 of valve housing 94. No walls may separate fluid chambers 140 or 106 into separate compartments in this embodiment. First valve member 136 may be associated with first volute 76, while second valve member 138 may be associated with second volute 80. A first port 142 within wall member 141 may communicate fluid chamber 140 with first volute 76, while a second port 144 within wall member 141 may fluidly communicate fluid chamber 140 with second volute 80. First and second valve members 136, 138 may include first and second sealing surfaces (not shown), respectively, that are configured to selectively restrict fluid flow through first and second ports 142, 144. Both of first and second valve members 136, 138 may be connected to a rod member 146 to rotate together about pivot axis 132 when an input from common actuator 92 is received.

In the embodiment of FIGS. 5-8, wastegate valve 128 may be substantially axially aligned with balance valve 126 and include a sleeve member 148 fixedly connected to pivot member 126 and configured to at least partially receive rod member 146 of balance valve 126. A valve member 150 of wastegate valve 128 may be rigidly connected to rotate with sleeve member 148 and selectively restrict exhaust flow through a port 152 to common outlet 118 of turbine 40.

INDUSTRIAL APPLICABILITY

The disclosed exhaust system may be implemented into any power system application where charged air induction and exhaust gas recirculation are utilized. The disclosed exhaust system may be simple, have high durability, and offer control precision. Specifically, the fixed geometry nature of turbocharger 66 may decrease the complexity and cost of the disclosed exhaust system, while recirculation control valve 56, balance valves 88 or 126, and wastegate valves 90 or 128 may help to maintain precision and controllability. In addition, the location of recirculation control valve 56, sensor 46, and check valve 50 downstream of EGR cooler 54 may result in cooler operating temperatures of those components and extended component lives. Further, the use of check valve 50 may enhance turbocharger stability and efficiency. Finally, by utilizing direct flow sensing and feedback control, precise regulation of exhaust gas recirculation may be possible.

It will be apparent to those skilled in the art that various modifications and variations can be made to the disclosed turbocharger. Other embodiments will be apparent to those skilled in the art from consideration of the specification and practice of the disclosed turbocharger. It is intended that the specification and examples be considered as exemplary only, with a true scope being indicated by the following claims and their equivalents.

What is claimed is:

1. A turbocharger, comprising:
   a turbine housing having a first volute, a second volute, and a common outlet;
   a turbine wheel disposed between the common outlet and the first and second volutes;
   a first valve configured to selectively fluidly communicate the first volute with the second volute upstream of the turbine wheel;
   a second valve configured to selectively fluidly communicate the second volute with the common outlet to bypass the turbine wheel, the first and second valves sharing a common pivot axis; and
   a common actuator configured to move the first and second valves.

2. The turbocharger of claim 1, wherein the first and second valves are configured to rotate, and the common actuator is configured to move linearly.

3. The turbocharger of claim 2, wherein a movement of the common actuator in a first direction by a first amount rotates only the first valve, and a movement of the common actuator in the first direction by a second amount rotates both the first valve and the second valve.

4. The turbocharger of claim 1, wherein the common actuator is pneumatically operated.

5. The turbocharger of claim 1, further including a valve housing connected to the turbine housing to at least partially enclose the first and second valves.

6. The turbocharger of claim 1, further including a valve housing connected to the turbine housing to at least partially enclose only the second valve, wherein the first valve is at least partially enclosed within the turbine housing.

7. The turbocharger of claim 1, wherein the common actuator is fixedly connected to only the first valve.

8. The turbocharger of claim 7, further including:
   a first pivot member fixedly connecting the common actuator to the first valve;
   a second pivot member fixedly connected to only the second valve; and
   a link member fixedly connected to the first pivot member and including a channel configured to slidingly receive the second pivot member.

9. The turbocharger of claim 7, further including:
   a first pivot member fixedly connecting the common actuator to the first valve; and
   a second pivot member fixedly connected to only the second valve and including a channel configured to slidingly receive the first pivot member.

10. The turbocharger of claim 1, wherein during movement of the common actuator, the first valve is moved to fluidly communicate the first volute with the second volute before the second valve is moved to fluidly communicate the second volute with the common outlet.

11. The turbocharger of claim 1, wherein the second valve includes a sleeve member aligned with the common pivot axis that receives at least a portion of the first valve.

12. The turbocharger of claim 1, wherein the first valve includes:
   a first sealing element associated with the first volute; and
   a second sealing element associated with the second volute and rigidly connected to the first sealing element.

13. The turbocharger of claim 12, further including:
   a fluid chamber;
   a first wall member separating the fluid chamber from the first and second volutes, the first wall member having a first port associated with the first volute and a second port associated with the second volute; and
   a second wall member separating the fluid chamber from the outlet and having a third port associated with the common outlet,
   wherein the first sealing element is configured to selectively block the first port, the second sealing element is configured to selectively block the second port, and the second valve is configured to selectively block the third port.

14. The turbocharger of claim 13, wherein:
   a flow area of the third port is greater than a flow area of the first port or a flow area of the second port; and
   a flow capacity of the first volute is less than a flow capacity of the second volute.

15. A method of handling exhaust from an engine having a first plurality of combustion chambers and a second plurality of combustion chambers, the method comprising:
- receiving exhaust from the first plurality of combustion chambers;
- receiving exhaust from the second plurality of combustion chambers;
- moving a common actuator in a first direction by a first amount to actuate a first valve of a valve assembly, thereby mixing exhaust received from the first plurality of combustion chambers with exhaust received from the second plurality of combustion chambers;
- directing exhaust received from the first and second pluralities of combustion chambers through a turbine; and
- moving the common actuator in the first direction by a second amount to actuate a second valve of the valve assembly, thereby allowing exhaust received from the second plurality of combustion chambers to bypass the turbine, the first and second valves sharing a common pivot axis.

16. The method of claim 15, further including converting linear motion from the common actuator to rotation of the valve assembly.

17. A power system, comprising:
- an engine having a first plurality of combustion chambers and a second plurality of combustion chambers;
- a first exhaust manifold configured to receive exhaust from only the first plurality of combustion chambers;
- a second exhaust manifold configured to receive exhaust from only the second plurality of combustion chambers;
- a turbocharger having a first volute in fluid communication with the first exhaust manifold, a second volute having a greater flow capacity than the first volute and being in fluid communication with the second exhaust manifold, a turbine wheel configured to receive exhaust from the first and second volutes, and a common outlet;
- a valve assembly including:
  - a first valve configured to selectively fluidly communicate the first volute with the second volute at a location upstream of the turbine wheel, and
  - a second valve configured to selectively fluidly communicate the second volute with the common outlet to bypass the turbine wheel, the first and second valves sharing a common pivot axis; and
- a single actuator configured to move the valve assembly.

18. The power system of claim 17, wherein the single actuator is configured to:
- move in a first direction by a first amount to actuate the first valve, thereby fluidly communicating the first volute with the second volute at a location upstream of the turbine wheel; and
- move in the first direction by a second amount to actuate the second valve, thereby fluidly communicating the second volute with the common outlet to bypass the turbine wheel.

* * * * *